(12) United States Patent
Sutherland et al.

(10) Patent No.: US 10,484,313 B1
(45) Date of Patent: Nov. 19, 2019

(54) DECISION TREE NAVIGATION THROUGH TEXT MESSAGES

(71) Applicant: Amazon Technologies, Inc., Seattle, WA (US)

(72) Inventors: Andrew Gardiner Sutherland, Seattle, WA (US); Kristopher William Bell, Issaquah, WA (US); Kathleen Ann Mitchell Gavenman, Seattle, WA (US); Farrukh Raza, Redmond, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 46 days.

(21) Appl. No.: 15/336,934

(22) Filed: Oct. 28, 2016

(51) Int. Cl.
| | | |
|---|---|---|
| *G06F 17/00* | (2019.01) | |
| *H04L 12/58* | (2006.01) | |
| *G06F 3/0482* | (2013.01) | |
| *G06F 3/0488* | (2013.01) | |
| *G06N 5/02* | (2006.01) | |
| *H04W 4/12* | (2009.01) | |

(52) U.S. Cl.
CPC .......... *H04L 51/02* (2013.01); *G06F 3/0482* (2013.01); *G06F 3/0488* (2013.01); *G06N 5/022* (2013.01); *H04W 4/12* (2013.01)

(58) Field of Classification Search
CPC ............................... G06F 3/0488; H04L 51/02
See application file for complete search history.

(56) References Cited

U.S. PATENT DOCUMENTS

| | | | | |
|---|---|---|---|---|
| 8,589,407 | B2* | 11/2013 | Bhatia | H04L 51/02 707/748 |
| 8,612,233 | B2* | 12/2013 | Anand | H04M 3/4936 704/275 |
| 8,792,631 | B2 | 7/2014 | Addair | |
| 9,699,207 | B2 | 7/2017 | Chapman | |
| 9,785,715 | B1* | 10/2017 | Busey | G06N 20/00 |
| 9,800,727 | B1 | 10/2017 | Chakrabarty et al. | |
| 10,200,334 | B1 | 2/2019 | Cordell et al. | |
| 2002/0119793 | A1* | 8/2002 | Hronek | G06Q 30/0241 455/466 |
| 2005/0080930 | A1 | 4/2005 | Joseph | |
| 2006/0080130 | A1 | 4/2006 | Choksi | |
| 2006/0248474 | A1* | 11/2006 | Kimotsuki | G06F 3/0482 715/810 |

(Continued)

OTHER PUBLICATIONS

U.S. Appl. No. 15/234,200, filed Aug. 11, 2016, Final Office Action dated Nov. 1, 2018.

(Continued)

*Primary Examiner* — Keith D Bloomquist
(74) *Attorney, Agent, or Firm* — Thomas Horstemeyer, LLP (57) ABSTRACT

Disclosed are various embodiments for navigating a workflow using a text messaging interface. A client device executes an application. The application renders the messaging interface on a display. The application also renders within the messaging interface a response to a previous selection of a first user interface element. The application further renders a second user interface element within the messaging interface that, when manipulated, causes the application to remove the response and the second user interface element from the messaging interface and also to rerender the first user interface element within the messaging interface.

20 Claims, 8 Drawing Sheets

(56) References Cited

U.S. PATENT DOCUMENTS

| | | | |
|---|---|---|---|
| 2008/0049929 A1 | 2/2008 | Miloslavsky et al. | |
| 2008/0300053 A1* | 12/2008 | Muller | G06F 17/24 |
| | | | 463/31 |
| 2009/0132442 A1* | 5/2009 | Subramaniam | G06F 17/279 |
| | | | 706/12 |
| 2010/0142698 A1 | 6/2010 | Spottiswoode et al. | |
| 2011/0243310 A1 | 10/2011 | Franklin-Barr et al. | |
| 2012/0041903 A1* | 2/2012 | Beilby | G06N 3/004 |
| | | | 706/11 |
| 2012/0271643 A1 | 10/2012 | Da et al. | |
| 2012/0309436 A1* | 12/2012 | Lan | H04L 51/38 |
| | | | 455/466 |
| 2014/0044243 A1 | 2/2014 | Monegan et al. | |
| 2014/0067375 A1 | 3/2014 | Wooters | |
| 2014/0164302 A1 | 6/2014 | Di Fabbrizio et al. | |
| 2014/0222503 A1 | 8/2014 | Vijayaraghavan et al. | |
| 2014/0280612 A1* | 9/2014 | Beslic | H04L 12/1818 |
| | | | 709/206 |
| 2014/0365594 A1 | 12/2014 | Miner et al. | |
| 2015/0006632 A1 | 1/2015 | Tomkins et al. | |
| 2015/0073868 A1 | 3/2015 | Garman | |
| 2015/0348173 A1 | 12/2015 | Gillen | |
| 2016/0044083 A1 | 2/2016 | Galloway et al. | |
| 2016/0055563 A1 | 2/2016 | Grandhi | |
| 2016/0063993 A1 | 3/2016 | Dolan et al. | |
| 2016/0078512 A1 | 3/2016 | Yopp et al. | |
| 2016/0163311 A1 | 6/2016 | Crook et al. | |
| 2016/0173424 A1 | 6/2016 | Fuhrmann | |
| 2016/0173627 A1 | 6/2016 | Herling et al. | |
| 2016/0196491 A1 | 7/2016 | Chandrasekaran et al. | |
| 2016/0234245 A1 | 8/2016 | Chapman | |
| 2016/0260029 A1 | 9/2016 | Gelfenbeyn et al. | |
| 2016/0316059 A1 | 10/2016 | Nuta et al. | |
| 2016/0322044 A1 | 11/2016 | Jung et al. | |
| 2016/0379129 A1 | 12/2016 | Assem et al. | |
| 2017/0006161 A9 | 1/2017 | Akbar | |
| 2017/0032783 A1 | 2/2017 | Lord et al. | |
| 2017/0048170 A1* | 2/2017 | Smullen | H04L 67/322 |
| 2017/0118336 A1* | 4/2017 | Tapuhi | H04M 3/4938 |
| 2017/0132019 A1 | 5/2017 | Karashchuk et al. | |
| 2017/0139802 A1 | 5/2017 | Hajiyev et al. | |
| 2017/0195495 A1 | 7/2017 | Deora et al. | |
| 2017/0228771 A1 | 8/2017 | Singh et al. | |
| 2017/0230312 A1* | 8/2017 | Barrett | H04L 51/046 |
| 2018/0083894 A1* | 3/2018 | Fung | H04L 51/02 |
| 2018/0090135 A1* | 3/2018 | Schlesinger | H04L 51/16 |

OTHER PUBLICATIONS

U.S. Appl. No. 15/340,022, filed Nov. 1, 2016, Response to Non-Final Office Action dated Feb. 8, 2018.

U.S. Appl. No. 15/340,022, filed Nov. 1, 2016, Final Office Action dated Jun. 29, 2018.

U.S. Appl. No. 15/234,200, filed Aug. 11, 2016, Response to Non-Final Office Action dated Mar. 8, 2018.

U.S. Appl. No. 14/974,501, filed Dec. 18, 2015, Final Office Action dated Mar. 17, 2017.

U.S. Appl. No. 14/974,501, filed Dec. 18, 2015, Notice of Allowance dated Mar. 22, 2018.

U.S. Appl. No. 15/340,022, filed Nov. 1, 2016, Non-Final Office Action dated Feb. 8, 2018.

U.S. Appl. No. 15/234,200, filed Aug. 11, 2016, Non-Final Office Action dated Mar. 8, 2018.

U.S. Appl. No. 14/974,501, filed Dec. 18, 2015, Response to Non-Final Office Action dated Dec. 19, 2016.

U.S. Appl. No. 14/974,501, filed Dec. 18, 2015, Non-Final Office Action dated Jul. 27, 2016.

U.S. Appl. No. 15/340,022, filed Nov. 1, 2016, Non-Final Office Action dated Mar. 7, 2019.

U.S. Appl. No. 15/234,200, filed Aug. 11, 2016, Notice of Allowance dated Apr. 3, 2019.

U.S. Appl. No. 14/974,501, filed Dec. 18, 2015, Response to Final Office Action dated Mar. 17, 2017.

U.S. Appl. No. 14/974,501, filed Dec. 18, 2015, Advisory Office Action dated May 15, 2017.

U.S. Appl. No. 14/974,501, filed Dec. 18, 2015, Non-Final Office Action dated Jul. 7, 2017.

U.S. Appl. No. 14/974,501, filed Dec. 18, 2015, Response to Non-Final Office Action dated Jul. 7, 2017.

U.S. Appl. No. 15/340,022, filed Nov. 1, 2016, Notice of Allowance dated Jul. 3, 2019.

* cited by examiner

DECISION TREE NAVIGATION THROUGH TEXT MESSAGES

BACKGROUND

Decision trees are often used to make informed decisions regarding workflow management. For example, a decision tree may be used to guide a user through a particular workflow or to guide a user to select the appropriate workflow to initiate. As another example, a decision tree can be used to solicit information based on various factors.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

A decision tree is a graph used to model decisions and their possible consequences. Accordingly, decision trees can be used to model workflows, algorithms, and other automated or semi-automated behavior. In some instances, a decision tree can be used to model communications between an automated service agent, such as a chat bot, an automated attendant (e.g., for an interactive voice response unit), or similar artificially intelligent service agent. In these instances, the decision tree can model a conversation, where a user may be presented with a question (e.g., "How may I help you?") and several potential responses (e.g., "I would like to make a return." or "I would like to check the status of my package."). The response that the user provides thereby determines which branch of the decision tree is followed to continue the conversation, with multiple levels of the decision tree reflecting multiple levels of conversation.

However, artificially intelligent service agents are generally unable to allow a user to reverse the flow of the conversation modeled by a decision tree. For example, in a natural language conversation between two people, if a misunderstanding occurs or if someone changes his or her mind, one can communicate the misunderstanding or change in intent to the other easily while continuing the conversation. The following conversation illustrates the point:

Person 1: How can I help you?

Person 2: I want to return an item for a refund to my credit card.

Person 1: Sure, do you have your credit card with you?

Person 2: I changed my mind. Can I get store credit instead?

In contrast, a decision tree guiding an artificially intelligent service agent's conversation with a user may not provide for a user to notify the artificially intelligent service agent that he or she has changed his or her mind without introducing cycles into the decision tree.

However, various embodiments of the present disclosure allow for a user to navigate a decision tree or a similarly modeled workflow in a bi-directional manner. Should a user change his or her mind about a response provided to a message from an artificially intelligent service agent (e.g., a "chat bot"), the user can delete or otherwise cancel his or her response. This allows for the user to arbitrarily change the path the user wishes to follow through a decision tree without having to restart from the beginning. In the following discussion, a general description of the system and its components is provided, followed by a discussion of the operation of the same.

Figure 1:
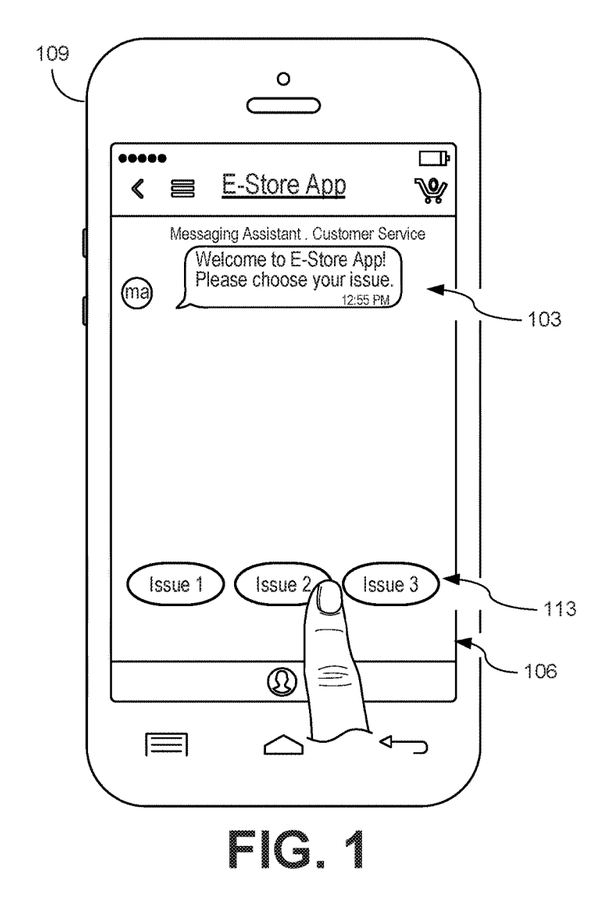
FIGS. 1-7 are pictorial diagrams of example user interfaces rendered by a client according to various embodiments of the present disclosure.

FIG. 1 depicts a user interface 103 rendered on a display 106 of a client device 109 according to an embodiment of the present disclosure. In the illustration of FIG. 1, the user interface 103 shows a message asking a user to select an issue the user would like addressed or for which the user is seeking assistance. The user interface 103 also contains a plurality of user interface elements 113 from which the user can select an issue (e.g., "Issue 1," "Issue 2," and "Issue 3") or type of issue. In some instances, these user interface elements 113 can be rendered as separate user interface elements 113. In other instances, the issues may be presented as a subelements of a single user interface element (e.g., as options in a list of options, etc.).

The client device 109 may include, for example, a processor-based system such as a computer system. Such a computer system may be embodied in the form of a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), media playback devices (e.g., media streaming devices, BluRay® players, digital video disc (DVD) players, set-top boxes, and similar devices), a videogame console, or other devices with like capability. The client device 109 may include one or more displays 106, such as liquid crystal displays (LCDs), gas plasma-based flat panel displays, organic light emitting diode (OLED) displays, electrophoretic ink ("E-ink") displays, projectors, or other types of display devices. In some instances, the display 106 may be a component of the client device 109 or may be connected to the client device 109 through a wired or wireless connection.

Figure 2:
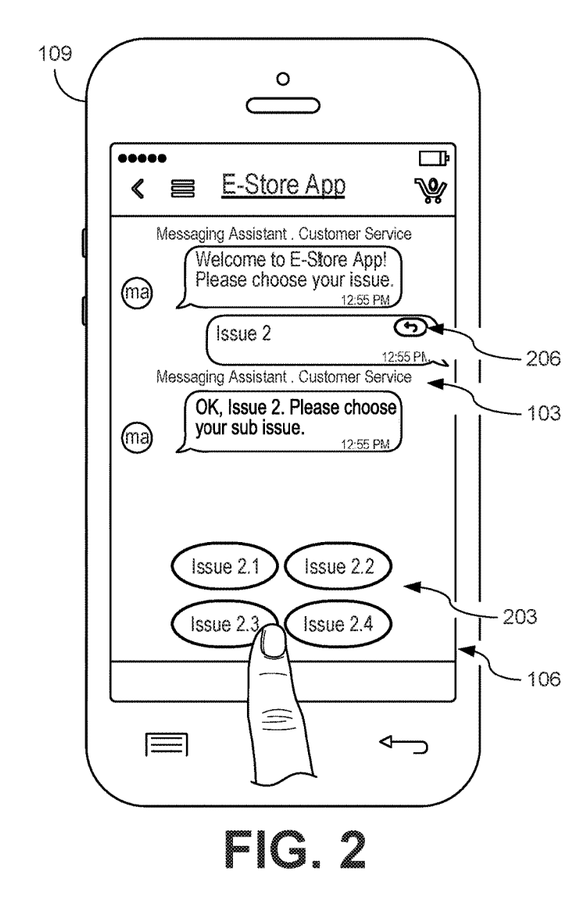

Moving on to FIG. 2, shown is an example of a subsequent rendering of the user interface 103 on the display 106 of the client device 109 in response to a user selecting an issue from the issues previously presented in the user interface 103 of FIG. 1. In the illustrated example, the user has previously selected that he or she would like help with "Issue 2." In response, the user interface 103 has been updated to reflect a new message asking the user to select a sub-issue. A new set of user interface elements 203 are rendered that allow a user to select an individual sub-issue. An issue can have multiple sub-issues if there are multiple options for resolving the issue. For example, a user that wishes to return an item can resolve the issue by having the item replaced, having the purchase amount refunded, etc.

In addition, a cancellation element 206 is rendered within the user interface 103. In this particular example, the cancellation element 206 is depicted as a button or similar control that a user could manipulate. If the user were to manipulate the cancellation element 206, the user would be able to cancel or "undo" their previous selection of an issue. For example, if the user were to manipulate the cancellation element 206, the user interface 103 would be updated. For example, the user interface 103 might be re-rendered to match the user interface 103 depicted in FIG. 1 to allow a user to select a different issue. In some instances, the cancellation element 206 may be rendered as part of an indication of a previous selection. However, the cancellation element 206 can be rendered in a number of forms other than what is depicted in FIG. 2.

For example, a cancellation element 206 could be integrated into the individual messages, allowing for gestures to be used to manipulate the user interface to cancel or "undo" a previous selection of an issue. For instance, a user could touch the area of the display 106 where a messaging element is rendered and swipe in a particular direction (e.g., left, right, up, down, diagonally, etc.). In response to the user's swipe, the user interface 103 would be updated. For example, the user interface 103 might be re-rendered to match the user interface 103 depicted in FIG. 1 to allow a user to select a different issue.

Figure 3:
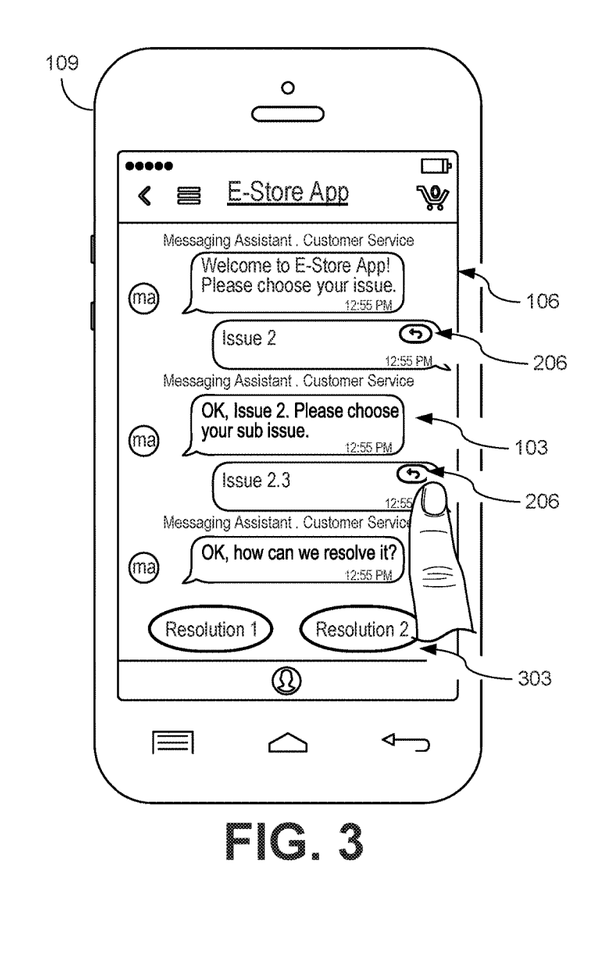

FIG. 3 is another depiction of some of the principles of the various embodiments of the present disclosure. FIG. 3 illustrates an example of a subsequent rendering of the user interface 103 on the display 106 of the client device 109 in response to a user selecting a sub-issue from the sub-issues previously presented in the user interface 103 of FIG. 2. A further set of user interface elements 303 is shown, asking the user to selection how he or she would prefer to resolve his or her issue/sub-issue. Another cancellation element 206 is rendered within the user interface 103 to allow a user to reverse, cancel, or otherwise undo his or her selection of a sub-issue. As illustrated, a user is moving to manipulate the cancellation element 206 in order to move back to the previous set of potential sub-issues. Although only a single cancellation element 206 is illustrated for purposes of simplicity and clarity, some embodiments may include a cancellation element 206 with each selection a user has previously made in order to allow the user to cancel or reverse multiple selections by manipulating a single cancellation element 206.

Figure 4:
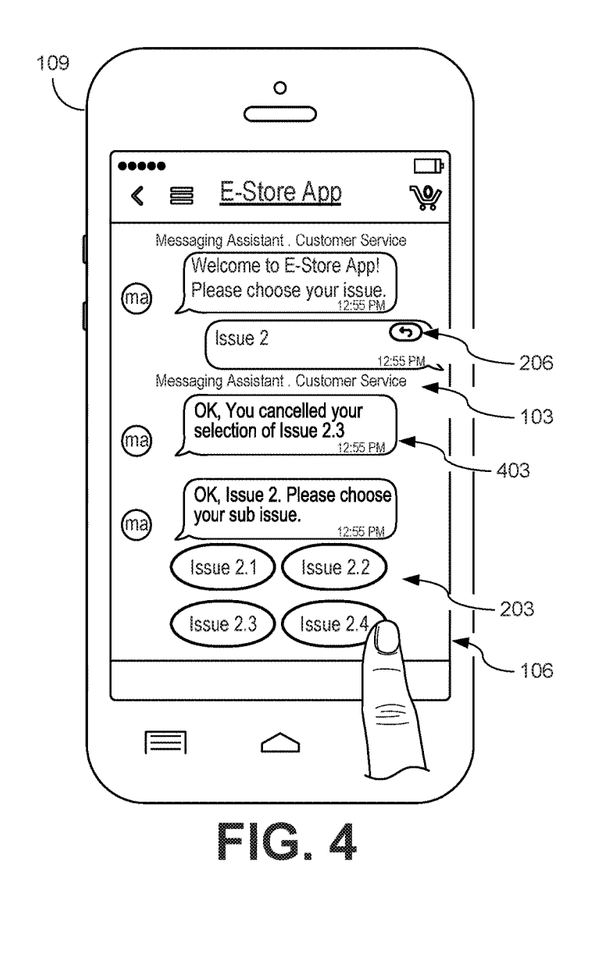

FIG. 4 depicts an example of a result of the user manipulating the cancellation element 206 in FIG. 3. Here, the user's previous selection of "Issue 2.3" has been removed as well as any references to the user's previous selection of "Issue 2.3." In some embodiments of the present disclosure, however, a confirmation element 403 can be rendered that provides an indication to a user that he or she has cancelled his or her previous selection. Accordingly, the user interface 103 is similar to or the same as the previous user interface 103 depicted in FIG. 2. For example, a set of user interface elements 203 is presented allowing the user to select a sub-issue. As depicted, the user can change his or her selection by selecting a new sub-issue by manipulating a different one of the user interface elements 203. To illustrate this functionality, the user is depicted in FIG. 4 as selecting a new sub-issue, in this case "Issue 2.4."

Figure 5:
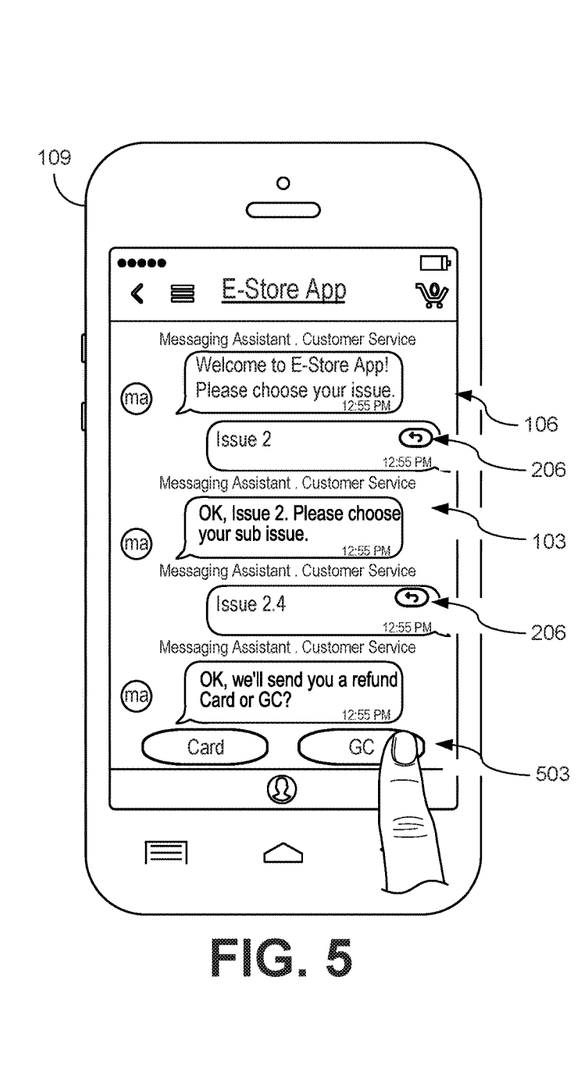

Moving on to FIG. 5, an example of an updated user interface 103 is depicted as rendered on the display 106 of the client device 109 in response to the user's selection of "Issue 2.4" as previously depicted in FIG. 4. A further set of user interface elements 503 is shown, asking the user to selection how he or she would prefer to resolve his or her issue/sub-issue. For example, the user could select either to have a refund applied to his or her card or to have a refund applied to a gift card. Another cancellation element 206 is rendered within the user interface 103 to allow a user to reverse, cancel, or otherwise undo his or her selection of sub-issue 2.4 the was previously selected in FIG. 4.

Figure 6:
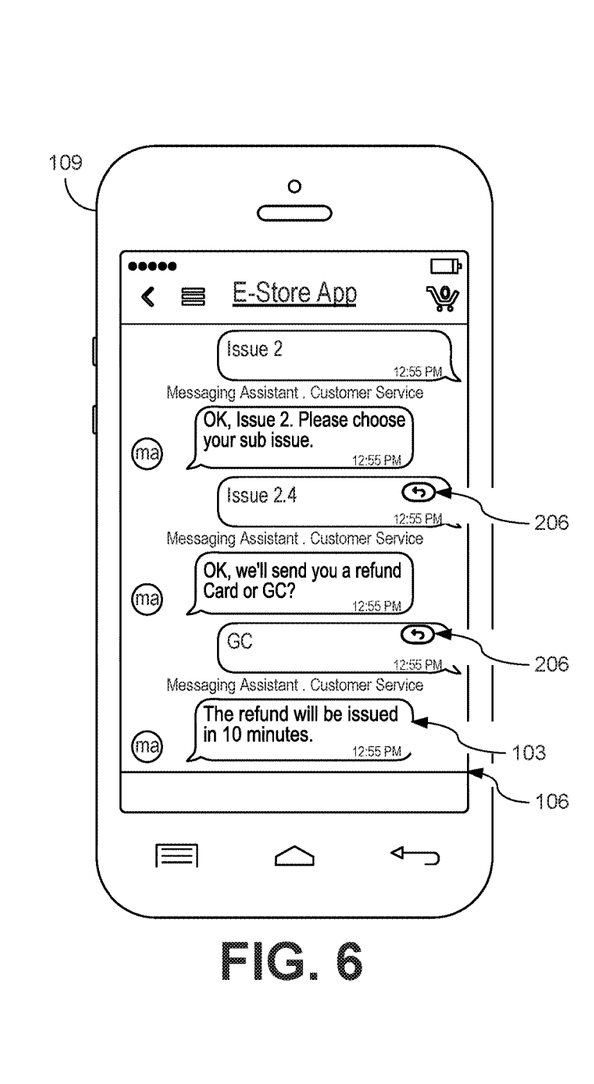
Figure 7:
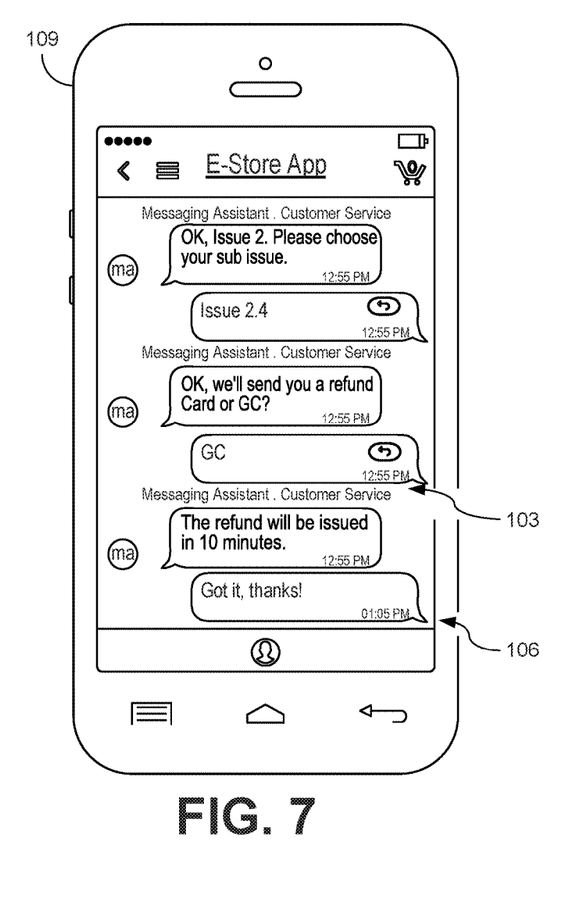

FIGS. 6 and 7 show examples of a user interface 103 rendered on the display 106 of the client device 109 in response to a user's selection of a preferred resolution of his or her issue in FIG. 5. In FIG. 6, a confirmation message is rendered to indicate the user when the refund can be expected to be issued. FIG. 7 depicts the user finishing the exchange.

Although FIGS. 1-7 depict an embodiment of the present disclosure that incorporates a text based interface on a touchscreen mobile device, other interfaces could incorporate the principals of the present disclosure. In a first example, a personal computer (PC) application could incorporate the principals of the present disclosure. For instance, a user could use a mouse to manipulate a cancellation element 206 or drag a text or message box across the display 106. In a second instance, a user could interact with a voice interface. The client device 109 could dictate responses to a user. Likewise, the client device 109 could listen for commands spoken by a user, including commands to cancel a previous instruction, selection, or other voice command or instruction provided by the user.

Figure 8:
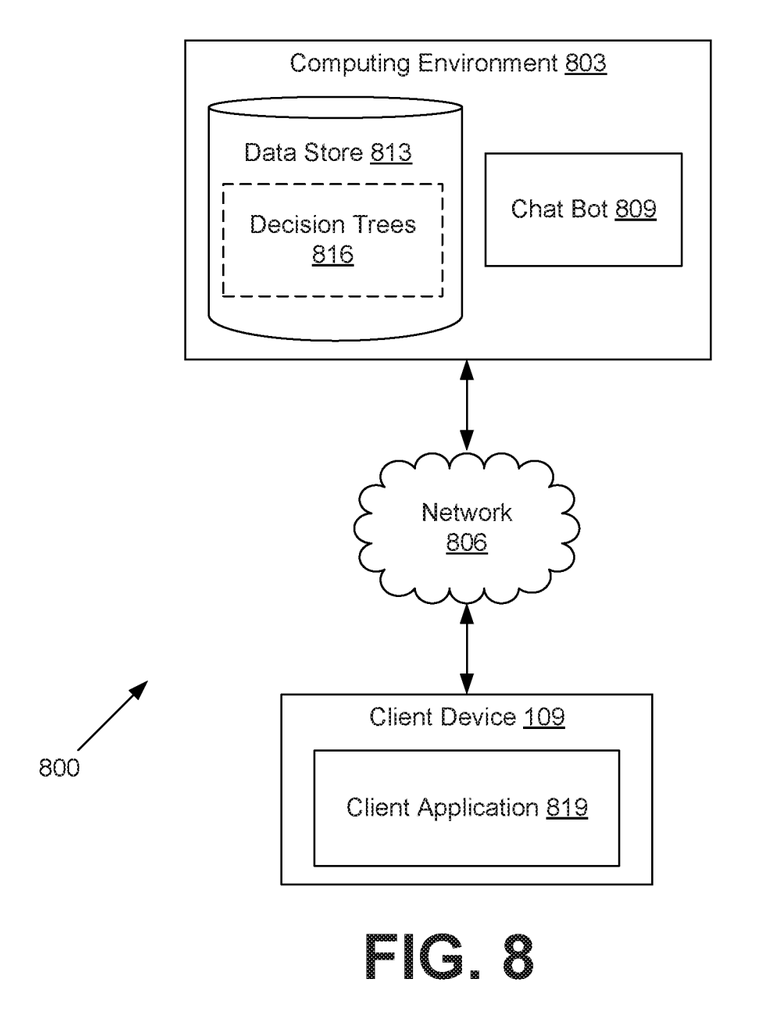
FIG. 8 is a drawing of a networked environment according to various embodiments of the present disclosure.

With reference to FIG. 8, shown is a networked environment 800 according to various embodiments. The networked environment 800 includes a computing environment 803, and a client device 109, which are in data communication with each other via a network 806. The network 806 includes wide area networks (WANs) and local area networks (LANs). These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 806 can also include a combination of two or more networks 806. Examples of networks 806 can include the Internet, intranets, extranets, virtual private networks (VPNs), and similar networks.

The computing environment 803 may include, for example, a server computer or any other system providing computing capability. Alternatively, the computing environment 803 may employ a plurality of computing devices that may be arranged, for example, in one or more server banks or computer banks or other arrangements. Such computing devices may be located in a single installation or may be distributed among many different geographical locations. For example, the computing environment 803 may include a plurality of computing devices that together may include a hosted computing resource, a grid computing resource or any other distributed computing arrangement. In some cases, the computing environment 803 may correspond to an elastic computing resource where the allotted capacity of processing, network, storage, or other computing-related resources may vary over time.

Various applications or other functionality may be executed in the computing environment 803 according to various embodiments. The components executed on the computing environment 803, for example, include a chat bot 809 and potentially other applications, services, processes, systems, engines, or functionality not discussed in detail herein.

The chat bot 209 is executed to communicate with a user of a client device 100 through various media. For example, the chat bot 209 can be configured to provide text responses to queries, requests, or instructions provided by a user (e.g., via electronic mail, a social media forum, a chat application, or similar messaging application). In another example, the chat bot 209 can include a voice synthesizer component that would allow the chat bot 209 to participate in a voice communication session with a user. For instance, the chat bot 209 could include a text-to-speech and a speech-to-text component in order to identify user requests or instructions and convert an appropriate response to a voice response.

Also, various data is stored in a data store 813 that is accessible to the computing environment 803. The data store 813 may be representative of a plurality of data stores 813, which can include relational databases, object-oriented databases, hierarchical databases, hash tables or similar key-value data stores, as well as other data storage applications or data structures. The data stored in the data store 813 is associated with the operation of the various applications or functional entities described below. This data can include one or more decision trees 816, and potentially other data.

A decision tree 816 is a tree or similar graph that is used to model conversations, workflows, or otherwise represent decisions, responses and potential outcomes. Accordingly, a decision tree 816 can include a plurality of nodes, where each node is linked to one or more other nodes. A root or head node represents the entry point to the decision tree 816. The root node may have one or more leaf or child nodes representing potential paths. Each leaf or child node can also be a parent node to one or more of its own leaf or child nodes. Each node in the decision tree 816 can include information such as a response or message to be used by the chat bot 209, an action to be performed or undertaken by a computing device or application, and other information. Each node can also include identifiers to its child or leaf nodes as well as the parent node.

For example, a decision tree 816 used by the chat bot 809 could include an root or head node that serves as an entry point for addressing customer issues. The root or head node could include a text message to be used by the chat bot 809 (e.g., "How can I help you?") and links to child nodes representing possible issues the customer may have (e.g., a child node for returning items, a child node for tracking order status, etc.). A child node for returning items could include a message to be used by the chat bot 809 (e.g., "What is wrong with the item?" or "Would you like a refund or a replacement?") and a list to additional child nodes representing potential resolutions. Individual nodes within the decision tree 816 may also include instructions or operations to be performed by various systems or applications. For example, a node within the decision tree 816 may instruct the chat bot 809 to provide information (e.g., order number, item number, purchase amount, etc.) to a payments system in order to initiate or process a refund. As another example, a node within the decision tree 816 may instruct the chat bot 809 to provide information (e.g., order number) to an order or shipment tracking application to determine the status of a current order or shipment.

The client device 109 is representative of a plurality of client devices that may be coupled to the network 806. The client device 109 may be configured to execute various applications such as a client application 819 or other applications. The client application 819 may be executed in a client device 109, for example, to access network content served up by the computing environment 803 or other servers, thereby rendering a user interface 103 (FIG. 1) on the display 106 (FIG. 1). To this end, the client application 819 may include, for example, a browser, a messaging application or other dedicated application, or other executable. The user interface 103 may include a network page, an application screen, or other user mechanism for obtaining user input. The client device 109 may be configured to execute applications beyond the client application 819 such as, for example, email applications, social networking applications, word processors, spreadsheets, or other applications.

Next, a general description of the operation of the various components of the networked environment 800 is provided. To begin, the client application 819 creates a connection to the chat bot 809 and receives an initial message from the chat bot 809. For example, if the client application 819 were a browser, the connection could be established using one or more hypertext transfer protocol (HTTP) requests using various synchronous or asynchronous web-application frameworks. If the client application 819 were a dedicated or independent application, the connection could be initiated using a custom protocol or could rely on one or more established messaging protocols (e.g., the extensible messaging and presence protocol (XMPP) or other messaging protocols). The initial message may be specified, for example, in a root node of a decision tree 816 used by the chat bot 809 to communicate with users. The chat bot 809 may also include a list of potential actions for the client application 819 to present to the user. Individual potential actions may correspond to individual child nodes to the root node.

The client application 819 then causes a user interface 103 to be rendered on a display 106 of the client device 109. The user interface can include the content of the initial message received from the chat bot 809 and one or more user interface elements (e.g., buttons, a drop-down list, etc.) that allow a user to select a response to the initial message. Once the user manipulates a user interface element, the corresponding response is provided to the chat bot 809.

When the chat bot 809 receives the response from the client application 819, the chat bot 809 selects the corresponding child node associated with the response to determine the next action to take. For example, if the response is that that the user is requesting to return an item, then the chat bot 809 may select a child node related to returns. The chat bot 809 could then send a message to the client application 819 specified in the child node. The chat bot 809 could also include a list of potential actions for the client application 819 to present to the user. For example, one action could be to exchange the item while another action could be to receive a refund for the item.

The client application 819 can then update the user interface 103 rendered on the display 106 of the client device 109 to reflect the response from the chat bot 809. For example, the client application 819 could display the message received from the chat bot 809 and one or more user interface elements that allow the user to select another response to the chat bot 809 (e.g., "I want to exchange the item." and "I want to receive a refund."). The client application 819 could also display a cancellation element 206 (FIG. 2) next to the initial action selected by the user. If the user were to manipulate the cancellation element 206, the user's previous reply to the chat bot 809 would be cancelled or undone, allowing the user to select an alternative branch in the decision tree 816 to follow.

Figure 9:
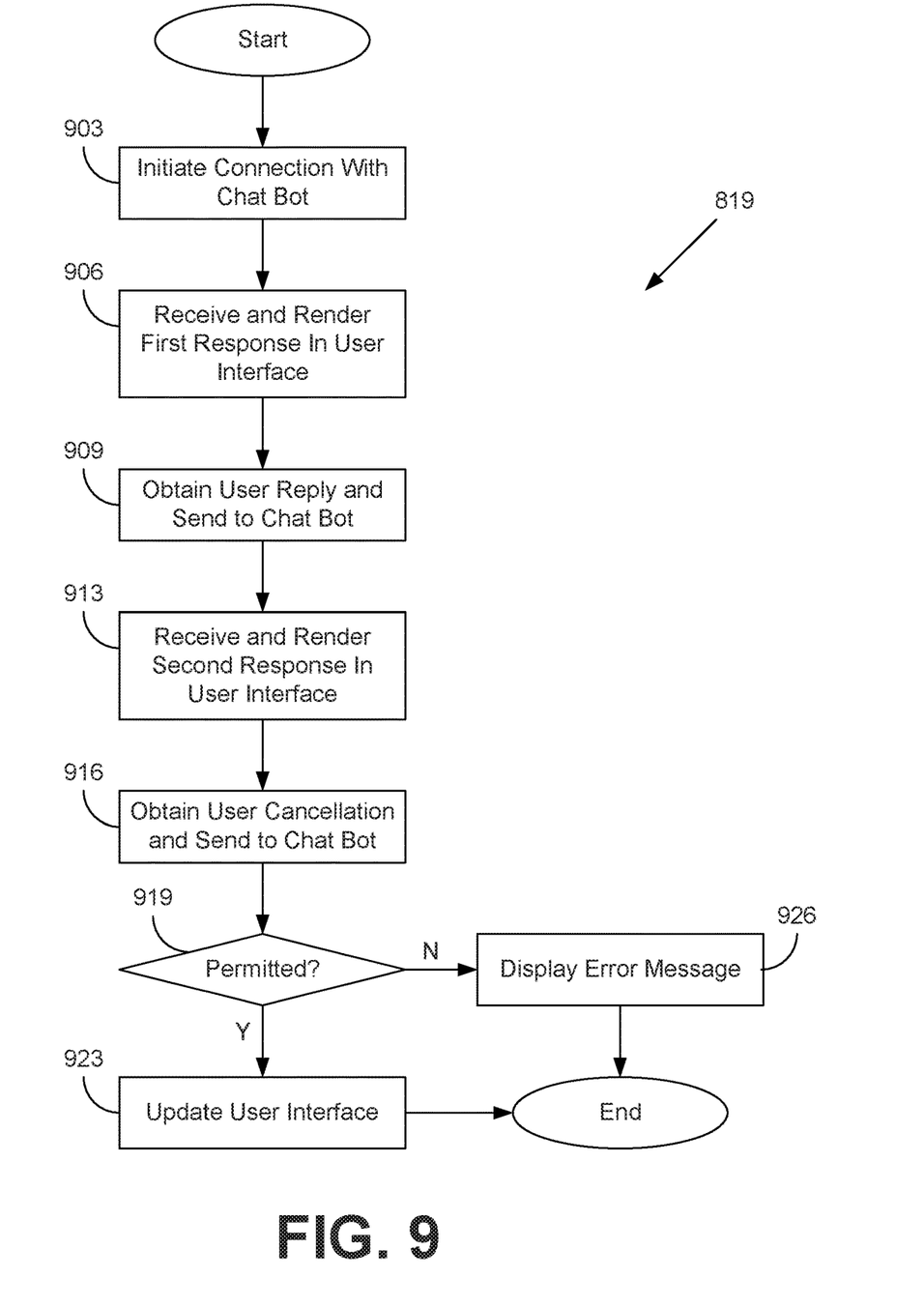
FIGS. 9 and 10 are flowcharts illustrating examples of functionality implemented as portions of an application executed in a computing environment in the networked environment of FIG. 8 according to various embodiments of the present disclosure.

Referring next to FIG. 9, shown is a flowchart that provides one example of the operation of a portion of the client application 819 according to various embodiments. It is understood that the flowchart of FIG. 9 provides merely an example of the many different types of functional arrangements that may be employed to implement the operation of the portion of the client application 819 as described herein. As an alternative, the flowchart of FIG. 9 may be viewed as depicting an example of elements of a method implemented in the client device 109 (FIG. 8) according to one or more embodiments.

Beginning with box 903, the client application 819 initiates a connection with the chat bot 809. This connection may be initiated, for example, when the client application 819 is opened or launched (e.g., a standalone or dedicated messaging application) or when a messaging component of the client application 819 is invoked (e.g., a messaging window or "Live Chat" window provided by a website and rendered in a browser). In some instances, the client application 819 can provide information to the chat bot 809 (FIG. 8), such as a user name or other identifier, in order for the chat bot 809 to provide more relevant or personalized responses.

Proceeding to box 906, the client application 819 receives and renders a first response received from the chat bot 809. An example of an initial response rendered on a display 106 (FIG. 1) of the client device 109 is depicted in FIG. 1. However, the initial response can be rendered in other manners. Generally, the initial response from the chat bot 809 will include a message and a list of options that a user can select. The user interface 103 (FIG. 1) created to display the message and options can include a mechanism for the user one or more of the options (e.g., a set of buttons, a scroll-wheel, a drop-down menu, etc.). In some instances, the options are mutually exclusive, such that selecting one option precludes selection of another option.

Moving on to box 909, the client application 819 can subsequently obtain a user's reply and forward it to the chat bot 809. For example, the client application 819 may detect a user's manipulation of a user interface element corresponding to a particular option or issue. The client application 819 could then forward this information to the chat bot 809 to notify the chat bot 809 which branch in the decision tree 816 should be followed.

Referring next to box 913, the client application 819 receives a second response from the chat bot 809 and renders information included in the second response within the user interface 103. An example of the client application 819 rendering the contents of the second response is previously provided in FIG. 2. The second response can contain information from the child node corresponding to the previous selection of the user. This can include a message for the user to be rendered in the user interface 103 as well as one or more further options for the user to select. These options can be rendered in a manner that allows the user to select one or more of the options (e.g., a set of buttons, a scroll-wheel, a drop-down menu, etc.). In some instances, the options are mutually exclusive, such that selecting one option precludes selection of another option.

In addition, the client application 819 can cause a cancellation element 206 (FIG. 2) to be rendered in association with the user's previous selection. Should a user select the cancellation element 206, the client application 819 would send a message to the chat bot 809 to return to node in the decision tree corresponding to the user's cancelled selection. An example of the user selecting a cancellation element 206 is previously provided in FIG. 3.

Proceeding to box 916, the client application 819 can obtain a cancellation event and forward it to the chat bot 809. For example, the client application 819 may detect that the user has manipulated a cancellation element 206. In response, the client application 819 can send a message to the chat bot 809 that the user has manipulated the cancellation element 206 and indicating the corresponding reply to the chat bot 809 or node in the decision tree 816 that the user has chosen to cancel.

Moving on to box 919, the client application 819 receives a message from the chat bot 809 indicating whether the user is permitted to initiate a cancellation at the requested branch or node in the decision tree 816. A user may not be permitted to initiate a cancellation for any number of reasons. For example, some actions or decisions may be irreversible once they have occurred. For instance, if a user has requested that refund be issued, the refund may be irreversible once the money has been deposited to a user's bank account. As another example, a user may be unable to cancel an order once the order has shipped, requiring the user to instead separately request a return at a later point in time. In some instances, an action may be deemed irreversible once a triggering event has occurred (e.g., refund deposited or order shipped) or after a predetermined or predefined window of time has elapsed. If the client application 819 receives a response from the chat bot 809 indicating that the cancellation is permitted or was successful, then execution proceeds to box 923. However, if the client application 819 receives a response from the chat bot 809 indicating that that cancellation is not permitted or was unsuccessful, then execution proceeds to box 926.

If the process proceeds to box 923, the client application 819 can update the user interface 103 to reflect a result of the user manipulating the cancellation element 206. The client application 819 can update the user interface 103 using a variety of approaches. Several examples of various embodiments are provided below, but other approaches can also be used. After updating the user interface 103, the process then ends.

As a first example, the client application 819 can remove the conversational thread occurring after the position where the user selected the cancellation element 206. In some instances, this may involve re-rendering an earlier version of the user interface 103 from a point in time prior to a user's cancelled selections of one or more options. An example of a re-rendering of the user interface 103 after the user has cancelled a previous selection via manipulation of a cancellation element 206 is previously presented in FIG. 4.

As a second example, the client application 819 could leave in place the previously rendered conversational thread. In this instance, the client application 819 could render a response received from the chat bot 806 corresponding to a point in time prior to a user's cancelled selections of one or more options. The user's previous selections and the previous responses received from the chat bot 806 would still be displayed or otherwise rendered in the user interface 103.

However, if the process proceeds to box 926, the client application 819 may render an error message within the user interface 103. The error message may, for example, inform the user that the user's previous selection of an option or previous reply cannot be cancelled. In some instances, the error message may also include a reason why the user can no longer cancel their previous selection (e.g., refund has already been issued to the user's bank account, the order has already shipped, etc.). The process then ends.

Figure 10:
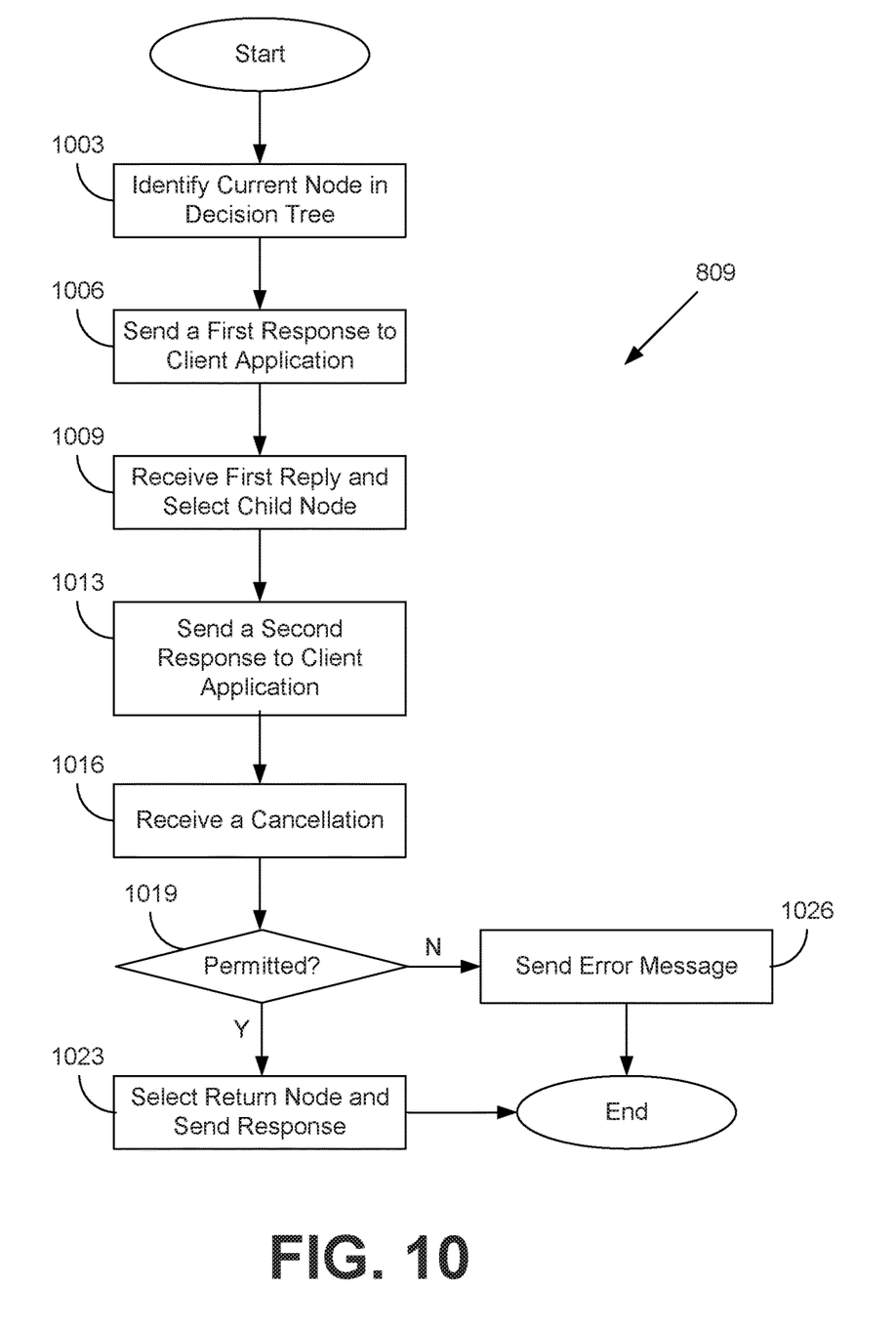

Referring next to FIG. 10, shown is a flowchart that provides one example of the operation of a portion of the chat bot 809 according to various embodiments. It is understood that the flowchart of FIG. 10 provides merely an example of the many different types of functional arrangements that may be employed to implement the operation of the portion of the chat bot 809 as described herein. As an alternative, the flowchart of FIG. 10 may be viewed as depicting an example of elements of a method implemented in the computing environment 803 (FIG. 8) according to one or more embodiments.

Beginning with box 1003, the chat bot 809 identifies a current node in the decision tree 816. For example, if the chat bot 809 is receiving an initial connection from a client application 819, the chat bot 809 could select the root node of a decision tree 816. As another example, if the chat bot 809 is currently interacting with a client application 819, the chat bot 809 could select a node in the decision tree 816 that corresponds to the most recently received reply or message from the client application 819.

Proceeding to box 1006, the chat bot 809 sends a first response to the client application 819. The first response can include a message and a list of options that a user can select. The individual options in the list of options can reflect child nodes of or branches from the current node in the decision tree 816.

Moving on to box 1009, the chat bot 809 receives a first reply from the client application 819. The first reply can include an identifier of an option selected by the user of the client application 819. In response, the chat bot selects an appropriate child node of the currently selected node within the decision tree 816, wherein the child node corresponds to the option selected by the user.

Referring next to box 1013, the chat bot 809 sends a second response to the client application 819. The second response can include a message for the user, which may have been stored in the selected child node. The second response can also include a list of additional options for the user to select. The additional options can represent, for example, one or more child nodes of the selected child node or branches in the decision tree 816 originating from the selected child node.

Proceeding to box 1016, the chat bot 809 receives a notification or message from the client application 819 that a user has chosen to cancel a portion of the interactions between the chat bot 809 and the client application 819. The cancellation message can include an identifier of the node in the decision tree 816 to which the user intends to return. For example, a user may have selected an incorrect option by accident in the first reply sent from the client application 819 to the chat bot 809. In some embodiments, however, a user can choose to cancel any option selected, and therefore any reply sent to the chat bot 809.

Moving on to box 1019, the chat bot 809 determines whether the user can return to the identified node in the decision tree 816 and, therefore, can cancel one or more previous interactions with the chat bot 809. A user may not be permitted, for example, to return to a node in the decision tree 816 for a variety of reasons. For example, a trigger event may have occurred that bars cancellation of one or more interactions (e.g., an order cannot be cancelled because it has already shipped or a refund cannot be cancelled because money has already been disbursed). To determine whether a user can return to the specified node, and thereby cancel any subsequent interactions (e.g., messages between the chat bot 809 and the client application 819), the chat bot 809 may traverse the decision tree 816 to determine if any nodes below the node the user wishes to return to are subject to a trigger condition or other constraint. If no trigger condition or other constraint is identified, the process proceeds to box 1023. However, if a trigger condition or other constraint is identified, then the process proceeds to box 1026.

If execution proceeds to box 1023, the chat bot 809 selects the node in the decision tree 816 to which the user intends to return. The chat bot 809 then sends a response to the client application 819. The response could include a message to be presented to the user, such as a message stored in the selected node. The response could also include a list of options for the user to select. Individual options in the list of options could include child nodes of the currently selected node in the decision tree 816 or branches in the decision tree 816 that proceed from the current position within the decision tree 816. After sending the message, the process subsequently ends.

However, if execution proceeds to box 1026, the chat bot 809 sends an error message to the client application 819. The error message may include information such as the reason why the user's cancellation request could not be processed. The process then subsequently ends.

Figure 11:
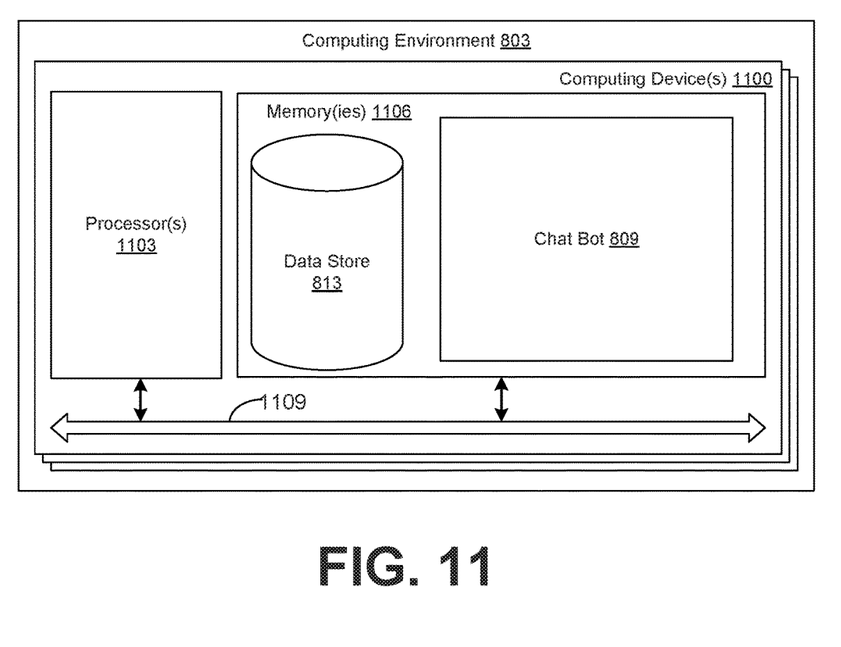
FIG. 11 is a schematic block diagram that provides one example illustration of a computing environment employed in the networked environment of FIG. 2 according to various embodiments of the present disclosure.

With reference to FIG. 11, shown is a schematic block diagram of the computing environment 803 according to an embodiment of the present disclosure. The computing environment 803 includes one or more computing devices 1100. Each computing device 1100 includes at least one processor circuit, for example, having a processor 1103 and a memory 1106, both of which are coupled to a local interface 1109. To this end, each computing device 1100 may include, for example, at least one server computer or like device. The local interface 1109 may include, for example, a data bus with an accompanying address/control bus or other bus structure as can be appreciated.

Stored in the memory 1106 are both data and several components that are executable by the processor 1103. In particular, stored in the memory 1106 and executable by the processor 1103 are the chat bot 809, and potentially other applications. Also stored in the memory 1106 may be a data store 813 and other data. In addition, an operating system may be stored in the memory 1106 and executable by the processor 1103.

It is understood that there may be other applications that are stored in the memory 1106 and are executable by the processor 1103 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 1106 and are executable by the processor 1103. In this respect, the term "executable" means a program file that is in a form that can ultimately be run by the processor 1103. Examples of executable programs may be, for example, a compiled program that can be translated into machine code in a format that can be loaded into a random access portion of the memory 1106 and run by the processor 1103, source code that may be expressed in proper format such as object code that is capable of being loaded into a random access portion of the memory 1106 and executed by the processor 1103, or source code that may be interpreted by another executable program to generate instructions in a random access portion of the memory 1106 to be executed by the processor 1103, etc. An executable program may be stored in any portion or component of the memory 1106 including, for example, random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory 1106 is defined herein as including both volatile and nonvolatile memory and data storage components. Volatile components are those that do not retain data values upon loss of power. Nonvolatile components are those that retain data upon a loss of power. Thus, the memory 1106 may include, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM may include, for example, static random access memory (SRAM), dynamic random access memory (DRAM), or magnetic random access memory (MRAM) and other such devices. The ROM may include, for example, a programmable read-only memory (PROM), an erasable programmable read-only memory (EPROM), an electrically erasable programmable read-only memory (EEPROM), or other like memory device.

Also, the processor 1103 may represent multiple processors 1103 or multiple processor cores and the memory 1106 may represent multiple memories 1106 that operate in parallel processing circuits, respectively. In such a case, the local interface 1109 may be an appropriate network that facilitates communication between any two of the multiple processors 1103, between any processor 1103 and any of the memories 1106, or between any two of the memories 1106. The local interface 1109 may include additional systems designed to coordinate this communication, including, for example, performing load balancing. The processor 1103 may be of electrical or of some other available construction.

Although the chat bot 809, the client application 819 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 9 and 10 show the functionality and operation of an implementation of portions of the client application 819 and the chat bot 809, respectively. If embodied in software, each block may represent a module, segment, or portion of code that includes program instructions to implement the specified logical function(s). The program instructions may be embodied in the form of source code that includes human-readable statements written in a programming language or machine code that includes numerical instructions recognizable by a suitable execution system such as a processor 1103 in a computer system or other system. The machine code may be converted from the source code through various processes. For example, the machine code may be generated from the source code with a compiler prior to execution of the corresponding application. As another example, the machine code may be generated from the source code concurrently with execution with an interpreter. Other approaches can also be used. If embodied in hardware, each block may represent a circuit or a number of interconnected circuits to implement the specified logical function or functions.

Although the flowcharts of FIGS. 9 and 10 show a specific order of execution, it is understood that the order of execution may differ from that which is depicted. For example, the order of execution of two or more blocks may be scrambled relative to the order shown. Also, two or more blocks shown in succession in FIGS. 9 and 10 may be executed concurrently or with partial concurrence. Further, in some embodiments, one or more of the blocks shown in FIGS. 9 and 10 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the chat bot 809 and the client application 819, that includes software or code can be embodied in any non-transitory computer-readable medium for use by or in connection with an instruction execution system such as, for example, a processor 1103 in a computer system or other system. In this sense, the logic may include, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the chat bot 809 and the client application 819, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 1100, the same client device 109, or in multiple computing devices in the same computing environment 803.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiments without departing substantially from the spirit and principles of the disclosure. All such modifications and variations are intended to be included herein within the scope of this disclosure and protected by the following claims.

Therefore, the following is claimed:

1. A system, comprising:
a mobile computing device comprising a processor, a memory, and a touch screen display; and
an application comprising machine readable instructions stored in the memory that, when executed by the processor, cause the mobile computing device to at least:
render a text messaging interface on the touch screen display;
render a response within the text messaging interface to a previous selection of a first user interface element, wherein the first user interface element represents a first plurality of manipulable subelements corresponding to respective ones of a plurality of paths for a decision tree;
render a second user interface element on the touch screen display, the second user interface element comprising a second plurality of manipulable subelements corresponding to respective ones of a plurality of alternative replies to the response; and
render a third user interface element on the touch screen display that, when manipulated, causes the application to at least:
send a command to a chat bot to return to a previous state in the decision tree in response to a user manipulation of the third user interface element, wherein the previous state in the decision tree is associated with the first user interface element;
receive a reply to the command, the reply indicating whether a return to the previous state in the decision tree remains currently possible; and
update the text messaging interface on the touch screen display based at least in part on the reply to the command.

2. The system of claim 1, wherein the second user interface element is a component of the response.

3. The system of claim 1, wherein causing the application to update the text messaging interface on the touch screen display based at least in part on the reply to the command further comprises causing the application to at least:
determine that the reply to the command indicates that the return to the previous state in the decision tree is permitted;
remove the response from the text messaging interface;
remove the second user interface element from the text messaging interface;
remove the third user interface element from the text messaging interface; and
rerender the first user interface element within the text messaging interface on the touch screen display.

4. The system of claim 1, wherein causing the application to update the text messaging interface on the touch screen display based at least in part on the reply to the command further comprises causing the application to at least:
determine that the reply to the command indicates that the return to the previous state in the decision tree is prohibited; and
render a message within the text messaging interface that indicates that the return to the previous state in the decision tree is prohibited.

5. A system, comprising:
a computing device comprising a processor, a memory, and a display; and
an application comprising machine readable instructions stored in the memory that, when executed by the processor, cause the computing device to at least:
render a messaging interface on the display;
render a response within the messaging interface to a previous user interaction with the computing device, the previous user interaction being linked to a first state of a decision tree and the response being linked to a second state of the decision tree; and
render a user interface element within the messaging interface that, in response to a subsequent user interaction with the computing device, causes the application to at least:
send a command to a chat bot to change the decision tree from the second state to the first state;
receive a reply from the chat bot, the reply indicating whether a change of the decision tree from the second state to the first state remains currently possible; and
update the messaging interface based at least in part on the reply from the chat bot.

6. The system of claim 5, wherein the user interface element is a first user interface element and the application further comprises machine readable instructions stored in the memory that, when executed by the processor, cause the computing device to further render a second user interface element comprising a plurality of subelements that correspond to respective ones of a plurality of replies to the response.

7. The system of claim 5, wherein the user interface element comprises a plurality of selectable subelements associated with respective ones of a plurality of branches in decision tree.

8. The system of claim 5, wherein the user interface element is a component of the response.

9. The system of claim 5, wherein the user interface element, when manipulated, further causes the application to cause the computing device to at least:
remove the user interface element from the messaging interface; and
rerender the previous user interaction within the messaging interface.

10. The system of claim 5, wherein the computing device comprises a mobile computing device and the display comprises a touchscreen display.

11. The system of claim 5, wherein causing the application to update the messaging interface based at least in part on the reply from the chat bot further comprises causing the application to at least:
determine that the reply indicates that the change of the decision tree from the second state to the first state is permitted; and
remove the response from the messaging interface.

12. The system of claim 5, wherein causing the application to update the messaging interface based at least in part on the reply from the chat bot further comprises causing the application to at least:
   determine that the reply indicates that the change of the decision tree from the second state to the first state is prohibited, the reply from the chat bot indicating a reason that the change from the second state to the first state is prohibited; and
   render within the messaging interface the reason that the change from the second state to the first state is prohibited.

13. A method, comprising:
   identifying, with a first computing device, a current node in a decision tree corresponding to a selection provided by a second computing device;
   sending, with the first computing device, a first response message to the second computing device, the first response message comprising a plurality of subsequent nodes in the decision tree;
   receiving, with the first computing device, a cancellation of the current node in the decision tree from the second computing device;
   evaluating, with the first computing device, that the cancellation of the current node in the decision tree remains possible based at least in part on an evaluation of a trigger condition; and
   sending, with the first computing device, a second response message to the second computing device, the second response message corresponding to a prior node in the decision tree.

14. The method of claim 13, wherein the second response message comprises an option to select the current node in the decision tree.

15. The method of claim 14, further comprising:
   adding, with the first computing device, the cancellation of the current node in the decision tree to a list of cancellations; and
   optimizing, with the first computing device, an order of presentation of options in the second response message based at least in part on the list of cancellations.

16. The method of claim 15, wherein optimizing the order of presentation of options in the second response message based at least in part on the list of cancellations further comprises ordering a list of options to select mutually exclusive nodes in the decision tree based at least in part on a frequency that individual options in the list of options are cancelled.

17. The method of claim 15, wherein optimizing order of presentation of options in the second response message based at least in part on the list of cancellations further comprises ordering a list of options to select mutually exclusive nodes in the decision tree based at least in part on a total number of cancellations for individual options in the list of options.

18. The method of claim 13, wherein the second response message comprises an option to select an alternative node to the current node in the decision tree.

19. The method of claim 13, wherein the plurality of subsequent nodes in the decision tree contained in the first response message are mutually exclusive.

20. The method of claim 13, wherein the cancellation specifies the prior node to return to in the decision tree and the method further comprises changing a current location in the decision tree from the current node to the prior node in the decision tree.

* * * * *